United States Patent [19]

Rouverol

[11] Patent Number: 4,589,300
[45] Date of Patent: May 20, 1986

[54] LOW TRANSMISSION ERROR GEARING

[76] Inventor: William S. Rouverol, 1331 Arch St., Berkeley, Calif. 94708

[21] Appl. No.: 641,701

[22] Filed: Aug. 17, 1984

[51] Int. Cl.[4] .................... F16H 55/06; F16H 55/08
[52] U.S. Cl. .................................. 74/462; 74/457; 74/460
[58] Field of Search ............... 74/462, 460, 458, 457

[56] References Cited

U.S. PATENT DOCUMENTS

| | | | |
|---|---|---|---|
| Re. 28,696 | 1/1976 | Rouverol | 74/462 |
| 1,772,986 | 8/1930 | Dunham | 74/461 |
| 1,825,621 | 9/1931 | Cox | 74/462 |
| 3,251,236 | 5/1966 | Wildhaber | 74/462 |
| 3,269,205 | 8/1966 | Niemann | 74/462 |
| 3,982,444 | 9/1976 | Rouverol | 74/462 |
| 4,031,770 | 6/1977 | Ishikawa | 74/462 |
| 4,041,794 | 8/1977 | Belot et al. | 74/462 |
| 4,051,745 | 10/1977 | Ishikawa | 74/462 |
| 4,108,017 | 8/1978 | Rouverol | 74/462 |
| 4,259,875 | 4/1981 | Rouverol | 74/462 |
| 4,276,785 | 7/1981 | Rouverol | 74/457 |

OTHER PUBLICATIONS

SAE Technical Paper 820508, Feb. 1982, "Maximum-Conjugacy Gearing", Watanabe et al.
*Industrial Mathematics*, vol. XI, Part 2, 1961, "The Nature of the Helical Gear Oblique Contact Line", pp. 1-17.
"Minimizing Gear Noise Exicitation", Nielsen et al., *AGMA Paper No. 85 FTM 12*, 1985.

Primary Examiner—Lawrence J. Staab
Assistant Examiner—Michael D. Bednarek

[57] ABSTRACT

The invention discloses means to reduce the noise and vibration that result from gear transmission error produced by variations in the mesh stiffness at different phases of tooth engagement. A substantially constant mesh stiffness is achieved by proportioning the teeth and the field of contact so that the product of incremental tooth length and tooth load per unit length at a given torque load integrated over the field of contact does not vary significantly as the tooth contact lines move across the field. To minimize deviations from the mean mesh stiffness, the teeth are made as flexible as possible and the total contact ratio as large as possible.

12 Claims, 4 Drawing Figures

LOW TRANSMISSION ERROR GEARING

This invention relates to the shape of gear teeth. Specifically it relates to the utilization in gear tooth meshes of features that will minimize operating noise and vibration. The invention comprises additions to and improvements on U.S. Pat. No. 4,276,785.

In power transmission gearing, noise and vibration are caused primarily by small deviations in the tangential displacements of the driven gear relative to the theoretically correct displacements based on the ratio of the number of teeth on the gear and pinion respectively. These deviations, which are measured along the line of action in the transverse plane, are called "transmission error" and can be accurately determined by optical scanning devices. In order to minimize dynamic effects, transmission error tests are made at low velocity ("slow roll"); also, to avoid measuring only the tooth surface areas that are the most prominent, the applied torque is directed against only one flank of the teeth and is sufficient to develop contact over the entire working surface of the teeth.

It will be evident that if the elastic stiffness of all the tooth pairs in engagement sums to a quantity that varies cyclically as the teeth move through the mesh zone, this variation will produce a proportionate variation in the tangential displacements of the driven gear. That is to say, all variations in mesh stiffness translate directly into transmission error.

In the interest of minimizing noise and vibration, there have been several attempts in the prior art to devise means to minimize the variations in mesh stiffness that produce transmission error. The basic method proposed in these earlier approaches is to employ tooth and gear proportions that keep the total or aggregate length of tooth contact constant. Such prior art includes an article by E. J. Wellauer, "The Nature of the Helical Gear Oblique Contact Line", *Industrial Mathematics,* Vol. XI, Part 2, 1961, p. 9; and U.S. Pat. No. 3,982,444. (U.S. Pat. No. 1,772,986 is less relevant.)

The proportioning of the field of contact to maintain a constant aggregate length of tooth contact line, as proposed in this prior art, is not a sufficient condition to insure a constant mesh stiffness at all positions of the lines of contact in the field. This is because the load per unit length of tooth is not the same at all points along the contact lines. It is the object of the present invention, therefore, to provide a sufficient specification to insure that the mesh stiffness variation will be reduced to the smallest practical value and under ideal conditions could theoretically be reduced to zero. The means to achieve this and other objects and advantages of the invention will be evident from the drawings as explained in the specification that follows.

Figure 1:
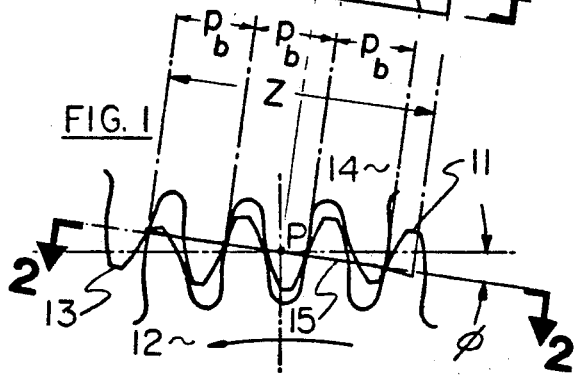
FIG. 1 is a partial section of a pair of mating gears embodying the invention taken perpendicularly to the common pitch element (i.e., "transversely") and showing mating helical teeth meshed along a path of contact.

In detail and referring to the drawings, in FIG. 1 typical teeth 11, 13 are shown in the transverse direction (direction of motion). Teeth 11 are on the smaller gear 12 (pinion) and teeth 13 are on the larger gear 14. Teeth 11 and 13 made contact along a path of contact 15 of length Z. Other parts of pinion 12 and gear 14, such as hubs, webs, rims, keyways, etc., are standard and are omitted in the interest of clarity.

Figure 2:
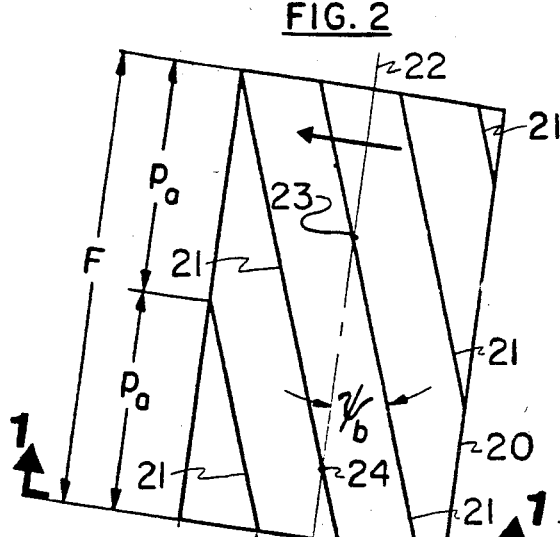
FIG. 2 is a view in the direction 2—2 of FIG. 1, showing the lines of contact between the mating helical teeth and the field of contact through which these lines move.

FIG. 2 is a section through FIG. 1 in the direction 2—2, showing the field of contact 20 that is the area locus of lines of contact 21 between the mating teeth 11, 13. As FIG. 1 is a side view of a helical gear set, the lines of contact 21 will make an angle $\psi_b$, the base helix angle, with a line 22, which is called the common pitch element. Line 22 lies not only in the field of contact 20 but also in the pitch surfaces of pinion 12 and gear 14.

The width of the field 20 is the active face width F, and if the direction of rotation of the pinion 12 and the gear 14 are as shown by the arrow in FIG. 1, the lines of contact 21 will move across the field 20 from right to left as shown by the arrow in FIG. 2. The spacing of adjacent lines of contact 21 in the direction of the common pitch element 22 is called the "axial pitch" ($P_a$), and in the direction of motion or transverse direction, the "base pitch" ($p_b$). The active face width F divided by the axial pitch $p_b$ is called the "face contact ratio" (also the "axial contact ratio" or "overlap ratio"). The maximum length of contact Z divided by the base pitch $p_a$ is called the "profile contact ratio" (also the "transverse contact ratio".). Both of these contact ratios may be referred to as "directional" contact ratios, as opposed to their sum, which is called the "total contact ratio". For gearing that has tooth profile relief or lengthwise crowning, the relevant directional contact ratio is developed only when the torque transmitted by the gears is sufficient to cause all the lines of contact to extend from one boundary of the field of contact to another. The smallest torque at which this occurs is called "full torque" in this specification and the ensuring claims.

An important feature of one embodiment of the invention is shown in

FIG. 2: The active face width F is equal to twice the axial pitch $p_a$, and the face contact ratio is therefore equal to an integer, namely two. This means that for any narrow element of the field such as an element at line 22 or any line parallel to it, the number of contact lines 21 intersected by the element will always be two regardless of where the contact lines 21 lie in the field 20. Further, if the teeth 11, 13 are not crowned in the lengthwise direction and the tooth alignment is perfect, the tooth load carried at each intersection point 23, 24 of the element 22 with a contact line 21 will be constant. The fact that the tooth pair stiffness is greater at the common pitch element 22 than it is at the start (right side) and end (left side) of the field 20 does not cause any variation of load on any of the elements such as line 22 or lines parallel to it, since this variation in tooth pair stiffness is entirely in the transverse direction. As a result, if the mesh stiffness is calculated by integrating the product of incremental tooth length and specific tooth stiffness (stiffness per unit length of tooth), then the result will be independent of the position of the lines of contact 21 in the field 20. This will result in a gear pair that has a completely constant stiffness and a zero transmission error insofar as such error is produced by variations in the mesh stiffness.

This attaining of a constant mesh stiffness is impeded by several practical considerations. For prior art gear forms such as 14½° or 20° involute gears, the teeth are comparatively rigid, and lengthwise crowning of the teeth is therefore essential in power train gearing if tooth misalignment is not to produce excessive loading of the tooth ends. Such crowning causes a variation in the mesh stiffness amounting typically to 8% to 16%. Alternatively, if the crowning is omitted, a comparatively small misalignment of the teeth will cause the tooth load at one edge of field 20 to be so much greater than at the other that not only will the teeth be very susceptible to end breakage, but the variation in mesh stiffness will be even greater than it is for a crowned tooth.

In order to reduce the variation in mesh stiffness to say 2% or less, it is necessary to greatly increase the tooth flexibility. The optimum way to do this without losing torque capacity is to utilize the "maximum-conjugacy" tooth form (hereinafter referred to as the "M-C" tooth form). This tooth form is described in U.S. Pat. No. 4,276,785 and also in the technical paper "Maximum-Conjugacy Gearing", by Yoshito Watanabe and W. S. Rouverol, Transactions of the American Society of Automotive Engineers, 1982 (SAE Paper No. 820,508).

The tooth form shown in transverse profile in FIG. 1 is the M-C tooth form, and it will be seen to have an exceptionally tall, thin profile. The whole depth of the teeth is at least 2.8 modules and in most cases 3.0 or more. (For the purposes of this specification and the ensuring claims, the "whole depth" is defined to exclude any round or chamfer on the tips of the teeth). Generally these larger whole depths will cause the average tooth pair stiffness of mating M-C teeth to be smaller than ten Newtons per micrometer per millimeter of face width. Use of the M-C tooth form in the above-described embodiments of the invention affords variations in mesh stiffness at full torque that for applications where the tooth misalignment does not exceed one part in a thousand are smaller than plus-or-minus one percent of the mean mesh stiffness.

Figure 3:
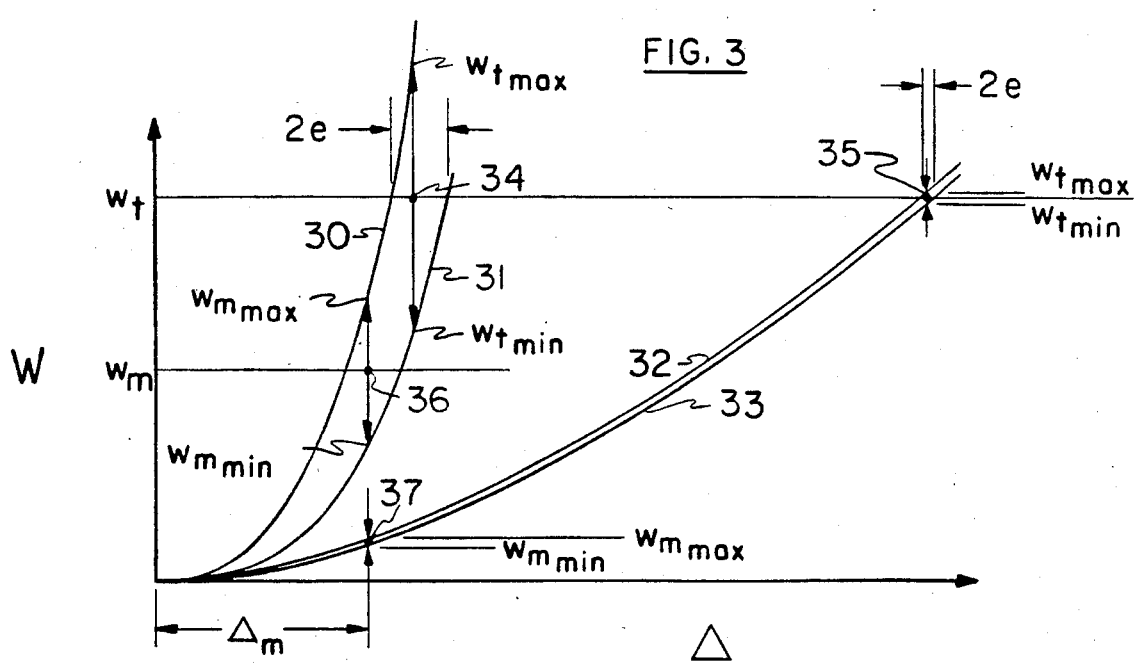
FIG. 3 is a diagram of total tangential tooth load W plotted against tangential deflection Δ for a set of gears embodying the invention (right hand pair of curves) as compared to those for a set of 20° involute gears (left hand pair of curves).

FIG. 3 is included to illustrated graphically why reduction in transmission error is so dependent on increased tooth flexibility. The figure shows four curves, of which the left-hand pair 30, 31 are load-deflection curves for typical 20° involute gears, and the right-hand pair 32, 33 are load-deflection curves for typical 8° M-C gears. Because of the much greater flexibility of the M-C teeth, the curves 32 and 33 show much more tangential deflection Δ for a given tangential tooth load W than the curves 30, 31 for 20° involute gears. In addition, all four of these load-deflection curves 30, 31, 32, 33 will be seen to be concave upward. This is because power train gears always have profile relief and/or crowning, and also a certain amount of misalignment. As a result the teeth 11, 13 make contact only in a small portion of field 20 when the torque load is light, but gradually the lines of contact 21 fill up more and more of field 20 until the entire field is occupied by them, at "full torque". This causes the stiffness of the mesh to increase considerably as the torque load is increased, giving the load-deflection curves 30, 31, 32, 33 the non-linear concave upward shape shown in FIG. 3.

It will also be noted in FIG. 3 that the load-deflection characteristic for both 20° involute and 8° M-C gears is represented not by a single curve but by a pair of curves (30, 31 and 32, 33). Each pair of curves has an upper curve (30, 32) and a lower curve (31, 33) that indicate the maximum and minimum tangential loads ($W_{mmax}$ and $W_{mmin}$, respectively) needed to overcome a given misalignment $\Delta_m$. In their upper portions, where these pairs of curves cross the tangential tooth load line for full torque ($W_t$), the curves indicate the amplitude of the fluctuating transmission error e on either side of the mean mesh deflection point (34, 35).

In order to explain why there is such a large difference in the ordinates for the two curves for 20° involute gears and such a small one in the case of the M-C gears, it is helpful to visualize the contact conditions of the teeth when the transmitted torque is very small. Because actual gear sets always have a certain amount of misalignment, the load lines 21 of FIG. 2 under light load would extend only a short distance, say f, from the lower boundary of field 20 (or its upper boundary, depending on the direction of the misalignment). Under these conditions the gears would function much like spur gears, with the number of teeth in contact oscillating between n and n+1, where n is unity for the involute gears and three or four for M-C gears. If the width of the loaded band f and the tooth pair stiffness per unit length are both assumed to be constant (to simplify the analysis), then it will be evident that the plus-or-minus variation in mesh stiffness is simply half of (n+1)kf minus nkf, or kf/2. The variation in mesh stiffness for a light load can therefore be seen to be in direct proportion to the specific tooth pair stiffness k.

The specific tooth pair stiffness k for M-C gearing is much smaller than that of 20° involute gearing. If standard cantilever beam theory is applied, deflection of a beam is $Pl^3/3EI$, where P is the applied load, 1 is the effective length, E is the modulus of elasticity, and I is the plane moment of inertia of the section. For a rectangular beam, this deflection equation becomes $4(1/h)^3 w/E$, where w is the load per unit length and h is the depth of the beam.

For M-C gears, the 1/h ratio is typically about twice as great as it is for 20° involute gears. Since the deflection varies as the cube of the 1/h ratio, it will be eight times as great, and the specific tooth pair stiffness for the M-C tooth will be one eighth of that for the 20° involute tooth. Because the variation in mesh stiffness is kf/2 for light loads as noted above, it too will be one eighth as great. It may be shown that this ratio of eight to one continues to apply as additional torque is imposed up to the point at which the mesh deflection is equal to the misalignment $\Delta_m$, so the vertical spread between curves 30 and 31 at a deflection $\Delta_m$ is about eight times as great for the 20° involute curves as it is for the M-C gears.

It should be noted that the mesh stiffness of a set of M-C gears is not eight times as great as that of a set of 20° involute gears. This is because the aggregate length of the lines of contact 21 for the M-C set is typically about 2.5 times as great as that of the 20° involute set, so the ratio of mesh stiffness for the two systems will be 8÷2.5, or about 3, as indicated in FIG. 3.

It has been noted that in the embodiment of the invention described above, the teeth 11, 13 should not be crowned in the lengthwise direction. On the other hand it is desirable that all four corners of the field 20 of FIG. 2 should have relief equal to the mesh deflection Δ at the design load $W_t$. The upper right and lower left corners of field 20 should have this relief because these are the corners at which the load lines 21 enter and leave the field 20, and this entry and exit process should be accomplished with the least possible shock. It is also desirable that the lower right and upper left corners also have the same relief, so that the specific tooth load will go to zero at these points and there will consequently be no discontinuities produced in a load-time diagram as the contact lines 21 pass these corners.

If the teeth 11, 13 are not to be crowned in the lengthwise direction, then their transverse profiles must be relieved at the tips and/or roots in order to obtain the correct amount of relief at the corners of the field 20. Such relief may be of several types, including the standard straight ramp-type relief ordinarily given to involute gears designed for use in power trains. Instead of being straight, these ramps may be curved slightly or even double-curved (inflected), depending on how much cam-like assumption of load is desired as a tooth enters the field 20.

As indicated above, the plotting points for curves such as shown in FIG. 3 are obtained by integrating the load per unit length of the contact line 21 for the entire area of the field 20 occupied by them. In this integration no negative values are included but a zero value is used instead whenever the total relief of the mating tooth surfaces at a given point in the filed exceeds the mesh deflection $\Delta$. With regard to the plus-or-minus variations in mesh stiffness as a decimal fraction of the mean mesh stiffness, these may be shown to be equal to the transmission error e at any given load (such as $W_t$ in FIG. 3) divided by the mean tangential deflection $\Delta$ at that load (i.e., points 34 or 35, as the case may be). This decimal fraction may also be shown to be equal to half the difference between $W_{max}$ and $W_{min}$ divided by their mean. (The conversion of the decimal fraction to a percentage is of course accomplished by multiplication by 100.)

In addition to the advantages of the M-C gearing in vertical spread for curves 30, 31 and 32, 33 in the first phase of loading (i.e., when the mesh deflection $\Delta$ is less than the misalignment $\Delta_m$), the advantages of the highly flexible M-C tooth are as great or greater in the higher loading domain. Since the 20° involute tooth is too stiff to function satisfactorily without crowning, the difference between the maximum and minimum transverse tooth load increases with increasing load. As a result, the transmission error e at full torque $W_t$ (i.e., at point 34) may be two or three times what it is at the torque $W_m$ that would deflect the mesh by an amount $\Delta$ (point 36). Because of the crowning, the value of the axial contact ratio that gives the smallest transmission error e for involute gears is not an integral value, but a value closer to an integral plus a half. This is reflected in the fact that nearly all automotive gears, which at present have the involute form, have axial and transverse contact ratios in the range 1.5 plus-or-minus 0.2.

In the case of M-C gears, the situation is entirely different. Because the crowning can be omitted, the vertical spread between curves 32 and 33 in the domain above the mesh deflection $\Delta_m$ does not increase because the mesh stiffness for elements parallel to the common pitch element 22 is constant once the teeth are loaded enough so the contact lines 21 extend from one side of the field 20 to the other. This causes the transmission error e at point 35 to be essentially the same as that at point 37, at the mesh deflection $\Delta_m$, and therefore very much smaller than that for involute gears at the same torque load $W_t$ (point 34). The noise excitation at corresponding speeds can be expected to be reduced in about the same proportion.

Because the transmission error e at point 35 in FIG. 3 is about the same as that at point 37, the question arises as to whether anything can be done to minimize the latter. Two expedients may be useful. One is to make the profile contact ratio $m_p$ an integer, so that the tooth load carried by the most heavily loaded side of the field will have a portion of load that does not produce variations in mesh stiffness or increases in transmission error. In this case both $m_F$ and $m_p$ will have substantially integral values.

Another recourse that is particularly useful for gear sets that operate partly at low load is to utilize a central portion on the transverse tooth profiles that has no relief and which generates a path length in the direction of motion that is substantially equal to one or two base pitch lengths. This produces a substantially constant mesh stiffness when the tooth load lines are mainly at one edge of the field or the other.

The embodiment of the invention described above is primarily useful in gear sets where the misalignment can be restricted to three or four parts per thousand (0.003 mm or 0.004 mm per mm of face width). If the misalignment is larger than this, then it may become advantageous to rotate the direction of relief and integral contact ratio by 90°. That is to say, the direction of zero profile relief becomes the direction of motion, as indicated again by an arrow in FIG. 4, and the lengthwise tooth profiles are crowned. In this case the profile contact ratio ($m_p$ or $Z/p_b$) may be made an integer if the gears are of the M-C tooth form. (In the involute system, profile contact ratios of two or higher are not attainable in gear sets having teeth that are coarse enough to be useful in power train applications).

Figure 4:
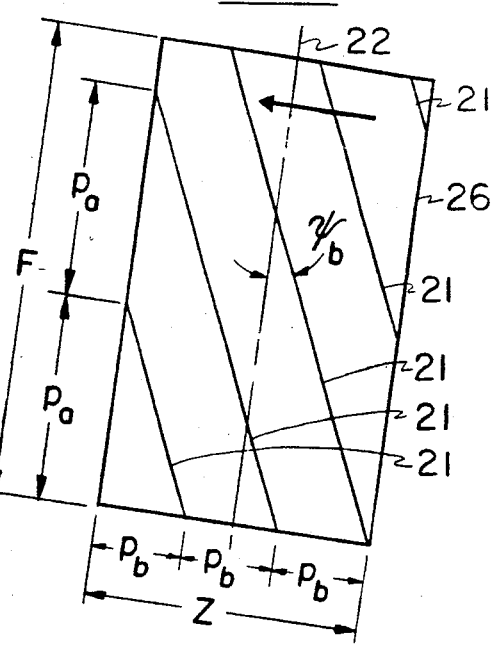
FIG. 4 is a diagram similar to FIG. 2 but for a field of contact in which the spacing and angle of the lines of contact is slightly different from the embodiment of FIG. 2.

In general, embodiments of the invention having fields of contact 26 such as diagrammed in FIG. 4, with integral values of the profile contact ratio, have greater variations in mesh stiffness (2% to 4%) than the first embodiment described above. This is because the specific tooth pair stiffness is not constant in the transverse direction. To offset this the profile contact ratios need to be quite high, at least 2.25 and preferably in the range 2.5 to 4.5. In co-planar axis gearing, profile contact ratios of this magnitude require that the teeth have transverse pressure angles at their pitch radii that are smaller than 14°, and in most cases smaller than 10°.

The following observations may be made with respect to the invention: (a) The principles of the invention may be applied to spiral bevel gears as well as helical gears, with appropriate changes in the shape of the fields of contact 21, 26. (b) For gears of a given size the most convenient characteristics that may be manipulated in order to obtain integral values of one or both directional contact ratios are tooth number and helix angle. (c) Increased tooth flexibility is a much more satisfactory means for accommodating misalignment than lengthwise tooth crowning is because it affords much larger total contact ratios and much smaller variations in mesh stiffness. (c) Since curves that plot gear noise against variations in mesh stiffness have rounded maxima and minima, most of the advantages of the invention can be realized by specifying directional contact ratios that are reasonably close to integers; accordingly the words "substantially an integer" in the ensuing claims should be construed as meaning a number that is within plus-or-minus 0.15 of an integer, as for example 3.14 or 2.87.

To clarify the foregoing disclosures and the scope of the ensuing claims, the following definitions are provided: "Mesh stiffness" means the combined stiffness in the tangential direction (i.e., transverse direction or direction of motion) of all the teeth that are instantaneously engaged; it is non-linear and is equal to the total tangential force needed to produce a given tangential relative motion of the pitch circles of the mating pair; the customary units are Newtons per micrometer or pounds per inch. "Average tooth pair stiffness" or "specific tooth stiffness" is the stiffness in the tangential direction of a pair of engaged teeth; it decreases with the distance of the point of engagement from the common pitch element because the effective length of the teeth increases with that distance (see FIG. 1); the customary units are Newtons per micrometer per millimeter of face width, or pounds per inch per inch of face width.

"The common pitch element" refers to the line at which the cylindrical or conical pitch surfaces of a pair of mating gears are tangent and contains the pitch points of all transverse section. "The path of contact" of a pair of engaged gears is a line which lies in a given transverse surface and is the locus of all points of contact between the mating tooth profiles in that surface; the maximum length a path of contact can have is when it extends from the addendum surface of one of a pair of engaged gears to the addendum surface of the other of the pair; this maximum length of the path of contact, shown as distance Z in FIGS. 2 and 4 for a pair of mating helical gears, is developed when the torque load on the gears is large enough so even the most heavily relieved or crowned portions of the tooth working surfaces are brought into contact. "The active face width" of a pair of mating gears is the length of the common pitch element; it does not include gear face width portions that extend beyond the ends of the teeth of the mating gear. "The module" of a tooth is the normal circular pitch divided by pi and is equal to the reciprocal of the normal diametral pitch expressed in millimeters; it should be noted that the module of a bevel gear increases in proportion to the distance from the pitch cone apex. "The whole depth" of a gear tooth is the product of the module and the sum of the active addendum and dedendum coefficients; in this specification and claims it does not include the round or chamfer at the tooth tip. "The average tooth pair stiffness" is calculated in accordance with International Standards Organization (ISO) standard TC/60 for computing dynamic load on gear teeth; briefly it is the load per unit length of contact line for a pair of engaged gear teeth that will produce unit deformation in the direction of the contact line; since this load varies slightly with position along the path for a helical or spiral bevel tooth, it is averaged for one half the active face width on either side of the pitch point. "The pitch radius" of a gear is the distance from the common pitch element to the central axis of the gear, measured in a direction normal to the common pitch element; the pitch radii are the same for all transverse planes of each member of a pair of parallel axis gears but increase with distance from the pitch cone apex for bevel gears.

I claim:

1. A pair of mating gears having axes that are coplanar and teeth that are formed to make contact along lines that (a) lie within a field of contact and (b) are slantingly disposed with respect to the common pitch element of said pair, said field of contact having a first pair of sides spaced apart by the maximum length of the path of contact of said pair of gears, and a second pair of sides spaced apart by the active face width of said pair of gears, said lines of contact extending from one of said sides to another of said sides when said pair of gears is transmitting full torque, thereby affording two directional contact ratios consisting of a profile contact ratio in the transverse direction and a face contact ratio in the axial direction, one of said two directional contact ratios being substantially an integer the whole depth of the teeth on one of said pair of gears being at least 2.8 modules.

2. A pair of mating gears according to claim 1 wherein said whole depth of said teeth on one side of said pair of gears is at least three modules.

3. A pair of mating gears according to claim 1 wherein the average tooth pair stiffness is smaller than ten newtons per micrometer per millimeter of face width.

4. A pair of mating gears according to claim 1 wherein the face contact ratio is substantially an integer.

5. A pair of mating gears according to claim 1 wherein the profile contact ratio is substantially an integer.

6. A pair of mating gears according to claim 1 wherein none of said teeth are crowned in the lengthwise direction but said teeth for at least one of said pair of gears have transverse profiles that are relieved.

7. A pair of mating gears according to claim 1 wherein said teeth on one of said pair of gears are crowned in the lengthwise direction but none of said teeth have transverse profiles that are relieved.

8. A pair of mating gears according to claim 1 wherein the profile contact ratio is at least 2.25.

9. A pair of mating gears according to claim 1 wherein the profile contact ratio is at least 2.5.

10. A pair of mating gears according to claim 1 wherein said teeth have at their pitch radii a transverse pressure angle that is smaller than 14°.

11. A pair of mating gears according to claim 1 wherein said teeth have at their pitch radii a transverse pressure angle that is smaller than 10°.

12. A pair of mating gears according to claim 1 wherein the face contact ratio and the profile contact ratio are both substantially integers.

* * * * *